United States Patent
Ricci et al.

(10) Patent No.: US 6,186,037 B1
(45) Date of Patent: Feb. 13, 2001

(54) TUBE SQUARING MACHINE HAVING AXIALLY STATIONARY CUTTING TOOL SHAFT AND AXIALLY MOVABLE TUBE HOLDING COLLET

(75) Inventors: Donato L. Ricci, W8477 - 162nd Ave., Hager City, WI (US) 54014; Brent Place, Red Wing, MN (US)

(73) Assignee: Donato L. Ricci, Hager City, WI (US)

( * ) Notice: Under 35 U.S.C. 154(b), the term of this patent shall be extended for 0 days.

(21) Appl. No.: 09/344,983

(22) Filed: Jun. 25, 1999

(51) Int. Cl.[7] ........................................................ B23B 5/16
(52) U.S. Cl. .................................. 82/113; 82/128; 82/130; 82/131
(58) Field of Search .............................. 82/113, 128, 130, 82/131, 1.2; 279/123, 151, 152, 153, 137

(56) References Cited

U.S. PATENT DOCUMENTS

| | | |
|---|---|---|
| 5,619,893 | 4/1997 | Pierce . |
| 5,671,646 | 9/1997 | Sandford et al. . |
| 5,711,197 * | 1/1998 | Ohmi et al. ............................. 82/113 |
| 5,836,727 * | 11/1998 | Scheer ................................ 82/113 X |
| 5,941,145 * | 8/1999 | Marshall et al. ....................... 82/113 |
| 5,960,686 * | 10/1999 | Bonow ................................ 82/113 X |

* cited by examiner

Primary Examiner—Henry Tsai
(74) Attorney, Agent, or Firm—Nikolai, Mersereau & Dietz, P.A.

(57) ABSTRACT

A portable tool for squaring the ends of tubes is adapted to be coupled to an electrically powered hand drill for driving a shaft carrying a cutting tool at the free end thereof. The shaft is journaled for rotation in a tubular torque housing that is effectively clamped to the drive motor partially. Surrounding the torque housing is an axial feed housing that is keyed to the torque housing by elongated keys disposed in axially aligned keyways formed in both the torque housing and the axial feed housing. A portion of the axial feed housing has external threads adapted to mate with internal threads on a manually rotatable feed ring. A workpiece clamping collet assembly is affixed to the end of the axial feed housing such that when the feed ring is rotated, the workpiece is may be axially displaced against the spinning/cutting tool.

6 Claims, 3 Drawing Sheets

TUBE SQUARING MACHINE HAVING AXIALLY STATIONARY CUTTING TOOL SHAFT AND AXIALLY MOVABLE TUBE HOLDING COLLET

BACKGROUND OF THE INVENTION

I. Field of the Invention

This invention relates generally to power tools used for metal working, and more particularly to a machine for preparing industrial tubing by squaring the end thereof prior to joining same to another tube or fitting in a welding operation and/or for trimming such a tube to a precise length in plumbing a fluid flow system.

II. Discussion of the Prior Art

The E.H. Wachs Company of Welling, Ill., produces and sells a tube squaring tool that conforms to the teachings of the Pierce U.S. Pat. No. 5,619,893. It comprises a hand-held, electrically-powered drive motor similar in construction to a conventional ½" power drill with a pistol grip, but instead of supporting a drill bit in a chuck, the motor shaft is coupled to a coaxially aligned shaft of the tube squaring tool which has a cutting tool retainer formed at the free end thereof. Surrounding the squaring tool shaft is a housing that is fixedly clamped to the drive motor housing at one end thereof, with the opposite end including a collet retainer for holding a collet used to clamp a tubular workpiece to be squared. Coaxially disposed about the housing is a feed nut having internal threads that mesh with external threads on a feed ring. When the feed nut is rotated in a clockwise direction, the shaft is displaced axially toward the end of the tube workpiece to be squared. In this manner, the rotatable cutting tool may be brought into contact with the end of a tube to thereby shave material from it.

Unfortunately, tube squaring machines conforming to the Pierce patent have a serious design flaw that adversely impacts the quality of the machining operation being performed. The shaft is journaled for rotation at two relatively closely spaced locations proximate the midpoint of the shaft such that a substantial portion of the tool's shaft and the weight of the tool holder portion thereof is cantilevered relative to the journal bearings. The cantilevered shaft length increases as the feed nut is rotated to advance the cutting tool toward the stationary workpiece. It is found that after a relatively short period of use, the cutting tool not only rotates but wobbles in a plane perpendicular to the normal axis of the shaft resulting in "chattering". This chattering leads to irregularities in the end of the tube being machined. In addition, the bearings themselves are subject to relatively rapid wear that requires that the tool be taken out of service for refurbishment.

SUMMARY OF THE INVENTION

The present invention obviates the foregoing difficulties by providing a tool for squaring the ends of tubular workpieces having a shaft member with first and second ends, the first end including a clamping device for holding a cutting tool bit therein and the second end adapted to be coupled to a shaft of a drive motor. A tubular torque housing surrounds the shaft and the torque housing has axially extending keyways formed in a peripheral surface thereof. The shaft is journaled for rotation within a central bore of the torque housing by bearings that are located proximate opposite ends of the shaft so that only a relatively small portion of the shaft is cantilevered beyond the end of the frontmost bearing. The shaft is constrained from axial displacement within the torque housing.

A generally cylindrical axial feed housing having first and second ends and a central bore extending therethrough receives the torque housing and cutting tool shaft therein and it, too, has axially extending keyways projecting radially outward of its central bore. Key members share the keyways of both the torque housing and the axial feed housing, preventing rotation of the axial feed housing about the torque housing. The first end of the axial feed housing has external threads formed thereon and its second end includes a circular flange. A workpiece holding collet clamping assembly is affixed to this circular flange. A feed ring fits over the axial feed housing and the feed ring has internal threads that engage the external threads on the axial feed housing. Now, when the feed ring is manually rotated, it will axially displace the axial feed housing with its attached workpiece holding collet in an axial direction toward or away from the cutting tool secured to the outer end of the rotatable shaft, depending upon the discretion of rotation of the feed ring.

Because the shaft is immovable in the axial direction and is well supported by journal bearings proximate opposed ends thereof, with only a short length of the shaft being cantilevered, there is no tendency for chattering to occur as in the prior art E.H. Wachs Co. tube squaring tool.

DESCRIPTION OF THE DRAWINGS

The foregoing features, objects and advantages of the present invention will become apparent to those skilled in the art from the following detailed description of a preferred embodiment, especially when considered in conjunction with the accompanying drawings in which.

DESCRIPTION OF THE PREFERRED EMBODIMENT

Figure 1:
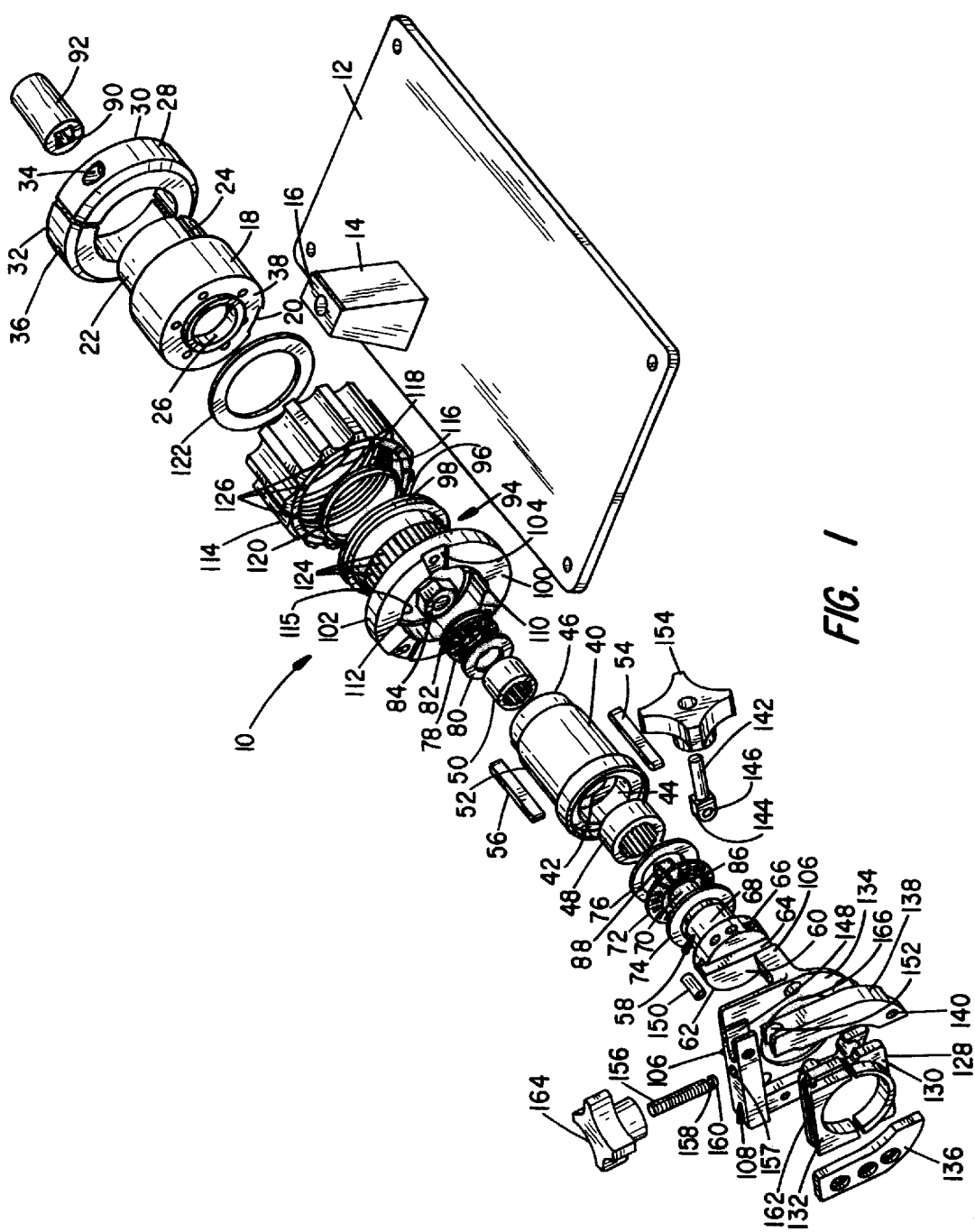
FIG. 1 is an exploded view of a tool for squaring the ends of tubular workpieces constructed in accordance with the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Figure 3:
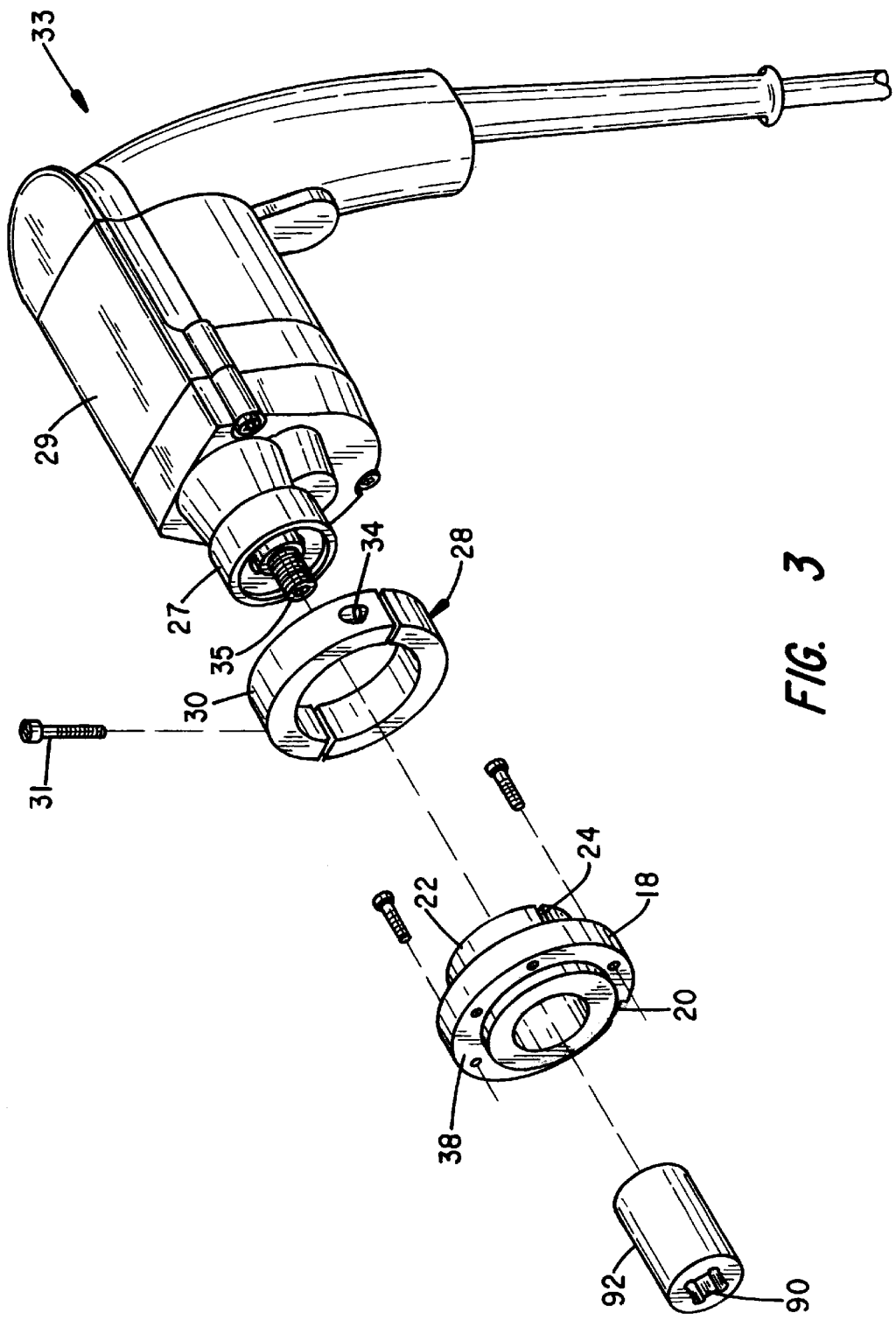
FIG. 3 is an exploded view showing the manner in which the tube squaring tool is coupled to a power drill as a drive motor.

Referring to FIG. 1, the tube squaring machine is indicated generally by numeral 10 and is seen to include a base plate 12 having a pedestal 14 secured thereto and projecting upwardly therefrom. Affixed to the upper end 16 of the pedestal by a bolt (not shown) is a motor mount adapter 18 comprising a cylinder having a notch 20 formed in its lower surface for indexing the motor mount adapter 18 to the pedestal 14. Referring to both FIG. 1 and FIG. 3, the motor mount adapter 18 includes a reduced diameter portion 22 that is split, as at 24, and a central, axially extending bore 26 extends through it, allowing the nose portion 27 of a power drill drive motor housing 29 to fit therein. A motor clamp ring 28, comprising two semi-circular segments 30 and 32, is adapted to fit over the reduced diameter portion 22 of the motor mount adapter. Now, when bolts 31 (FIG. 3) are passed through apertures as at 34 in the segment 30 and into a tapped hole as at 36 in segment 32 (FIG. 1), the two halves can be drawn tightly together to clamp about the reduced diameter portion 22 and squeeze the split segments thereof against the nose 27 of the motor housing 29 to thereby firmly clamp and support the drive motor 33 relative to the tube squaring tool 10 of the present invention.

Figure 2:
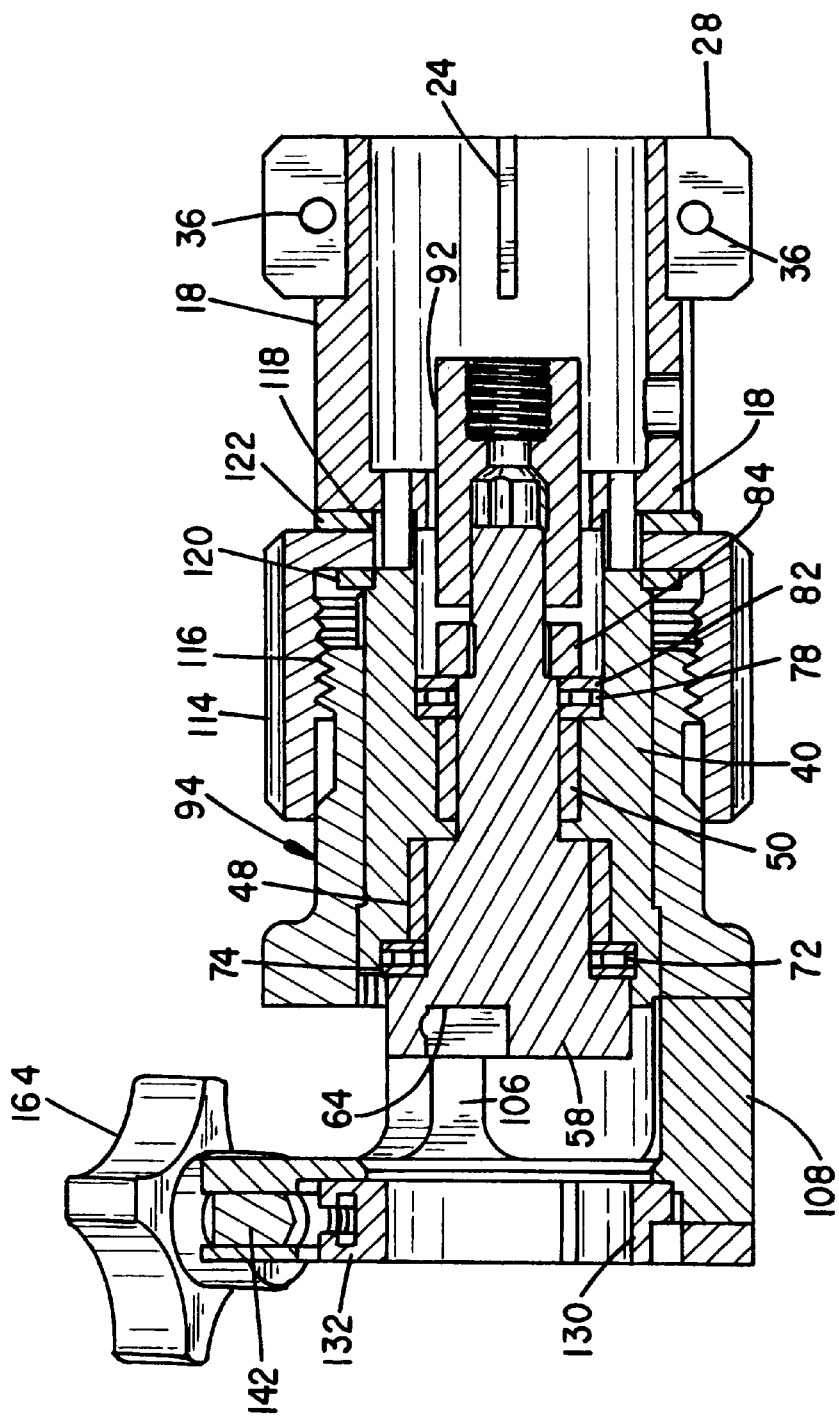
FIG. 2 is a longitudinal cross-sectional view illustrating the cooperative relationship between the part shown in FIG. 1.

Bolted to the front face 38 of the motor mount adapter 18 is a torque housing 40 (FIGS. 1 and 2). It is tubular in configuration and has a central bore 42 therethrough. Counterbores 44 and 46 are formed at opposed ends thereof for receiving a front needle bearing assembly 48 and a rear needle bearing assembly 50 therein. The tubular torque housing 40 includes axially extending keyways, as at 52, formed inwardly from the outer peripheral surface thereof for partially receiving approximately one-half the thickness of elongated key members 54 and 56 therein.

The needle bearings 48 and 50 are used to journal a cutting tool drive shaft member 58 for rotation within the torque housing 40. As can be seen in FIG. 1, the shaft 58 has a first end 60 comprising a cutting tool bit holder 62 that is adapted to hold a tool bit (not shown) within a diametrically extending groove 64, formed in a front face thereof. The tool bit is held in place by one or more set screws fitted into threaded bores as at 66. The cutting tool drive head shaft 58 has a smooth, machined shoulder portion 68 dimensioned to closely fit within the inner race of the front needle bearing assembly 48 which, in turn, fits within the counterbore 44. A second shoulder portion of reduced diameter 70 cooperates with the needle bearing 50 disposed in the counterbore 46 of the torque housing 40. A thrust bearing 72, along with thrust washers 74 and 76, is placed between the front bearing 48 and the tool holding member 60 of the shaft 58. Likewise, a rear thrust bearing 78 and associated thrust washers 80 and 82 cooperate with the rear needle bearing assembly 50 and a shoulder (not shown) defined by the counterbore 46 when a lock nut 84 is screwed onto the threaded portion 86 of the cutting head shaft 58. Thus, the shaft member 58 is captured and journaled for rotation within the torque housing 40.

The cutting tool drive shaft 58 includes a squared end portion 88 that is adapted to fit within a complimentary opening 90 of a shaft coupler 92. Shaft coupler 92 also fits over the drive shaft 35 of the drill motor 33 used to power the tube squaring machine.

Surrounding the torque housing 40 is a generally cylindrical axial feed housing member, indicated generally by numeral 94. The axial feed housing has a first end 96 that has external threads 98 formed thereon. The second end 100 includes an annular flange 102. The flange 102 includes a plurality of regularly angularly spaced recesses as at 104, for receiving corresponding mounting feet 106 of a collet housing member 108. Screws (not shown) are used to secure the feet 106 to the flange 102.

As can further be seen in FIG. 1, the axial feed housing 94 includes keyways 110 and 112 formed radially outward of the central bore 115 of the axial feed housing. Their depth is about one-half the thickness of key members 54 and 56. When the axial feed housing 94 is fitted over the torque housing 40, the axially extending keys 54 and 56 share both the keyways 52 on the torque housing and the keyways 110 and 112 on the axial feed housing. In that the torque housing 40 is rigidly affixed by bolts to the motor mount adapter 18, neither the torque housing nor the axial feed housing is able to rotate because of the presence of the keys 54 and 56 shared in the keyways.

As best seen in the cross-sectional view of FIG. 2, a feed ring 114 partially surrounds the axial feed housing 94 and formed on the internal diameter of the feed ring 114 are threads 116 that mate with the threads 98 of the axial feed housing 94. The feed ring 114 also has a central opening 118 formed in a rear surface thereof whose diameter is only slightly larger than the outside diameter of the rear portion 46 of the torque housing 40. Front and rear thrust washers 120 and 122 are placed about the reduced diameter portion 46 of the torque housing to sandwich the feed ring flange therebetween.

As seen in FIG. 1, it has been found expedient to provide equally spaced fiducial scale markings 124 about the periphery of the axial feed housing and these scale markings cooperate with indexing notches 126 formed on the front edge of the feed ring. The outer surface of the feed ring is scalloped to facilitate manual gripping and rotation thereof.

The collet housing 108 is adapted to support a variety of different size collets, only one of which is shown and is identified by numeral 128. Each of the collets comprise first and second semi-circular members 130 and 132 that cooperate with one another to form a circular opening of a predetermined size for receiving a cylindrical workpiece therethrough. The lower segment 130 is held in clamped relationship to the face 134 of the collet housing 108 by cover plates 136 and 138 which attach to the collet housing by bolts (not shown). The right cover plate 138 is pivotally connected to the collet housing 108 by a pin (not shown) passing through the aperture 140 therein and into a corresponding bore or aperture in the face 134. An eye bolt member 142 has an enlarged, flattened end portion 144 with a bore 146 formed therethrough in the transverse direction, the head portion dimensioned to fit in a slot 148 formed in the collet housing. A dowel pin 150 is inserted through aligned holes in the housing and in the head of the eye bolt, allowing it to pivot into a slot 152 formed in the upper end of the right cover plate 138. Now, when the knob 154 is screwed down along the shaft of the eye bolt 142 the cover plate 138 clamps the lower half 130 of the collet tightly in place.

To adjust the effective diameter of the collet, there is provided a threaded shaft 156 that passes through a threaded bore 157 in the collet housing. The lower end of the threaded rod 156 has an annular notch 158 defining a head portion 160 that is adapted slide into a T-slot 162 in the upper half 132 of the collet. A knob 164 is affixed to the threaded rod 156 to facilitate its rotation. Rotation of the knob 164 effectively displaces the upper portion 132 of the collet 128 relative to the lower half to clamp and unclamp a tubular workpiece inserted through the central opening of the collet as well as the central opening 166 formed through the face plate 134 of the collet housing 108.

Operation

In use, the knob 154 will be loosened on the threaded shaft 142 to the point where the eye bolt can be rotated out of the groove 152 on the right collet holder 138. The right collet holder can then be swung clockwise when viewed in FIG. 1, allowing the insertion of a collet of a desired size to accommodate the outside diameter of the tubular workpiece to be squared. The collet halves 130 and 132 are then assembled into the collet holder 108 and the right collet holder 138 is now rotated counterclockwise and the eye bolt 142 is lowered into the notch 152. Tightening the knob 154 firmly clamps the lower collet member 130 in place. As the upper collet member 132 is being inserted, the head 160 on the threaded shaft 156 is slid into the T-notch 162. Next, the tubular workpiece has one end thereof slipped through the circular opening of the collet and through the central opening 166 in the collet holder in facing relationship to the cutting tool located in the notch 64 on the left end of the cutting head shaft 58. Now, the knob 164 is rotated so as to close the collet around the workpiece and tightly clamp it in place.

The motor 33 can now be energized to rotate the shaft 58 within its bearings 48 and 50 contained in the torque housing 40. To bring the rotating cutting tool into engagement with the end of the workpiece to be squared, the operator will rotate the feed ring 114 in a clockwise direction. Because of the presence of the keys 54 and 56 in both the keyways of the torque housing 40 and the axial feed housing 94, the axial feed housing is constrained to move rearward in the axial direction, carrying the collet housing assembly 108 and the workpiece with it and against the spinning cutting tool supported in the tool holding member 60 on the end of shaft 58.

The scale 124 is such that as one of the notches 126 on the feed ring moves from one fiducial mark on the scale 124 to the next, the workpiece is moved 0.002", given the pitch on the threads 98 and 116.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A tool for squaring ends of tubular workpieces, said tool comprising:
    (a) a shaft member having first and second ends with said first end including a clamping member for holding a cutting tool bit therein and the second end adapted to be coupled to a shaft of a drive motor;
    (b) a tubular torque housing having a central bore therethrough, said torque housing having axially extending keyways formed in a peripheral surface thereof;
    (c) means for journaling the shaft member for rotation within the central bore of the torque housing;
    (d) a generally cylindrical axial feed housing having first and second ends and a central bore extending therethrough for receiving the torque housing therein and with axially extending keyways projecting radially outward of the central bore of the axial feed housing, the first end of the axial feed housing having external threads formed thereon, the second end including a circular flange;
    (e) a plurality of key members contained in said keyways of said torque housing and said axial feed housing in a shared relationship;
    (f) a workpiece holding collet assembly affixed to the circular flange of said axial feed housing; and
    (g) a feed ring having internal threads for engaging the external threads on the axial feed housing, rotation of the feed ring displacing the axial feed housing and workpiece holding collet assembly in an axial direction with respect to the second end of the shaft member.

2. The tool of claim 1 wherein the means for journaling comprises:
    (a) front and rear needle bearings disposed in the central bore of the torque housing and each surrounding a portion of said shaft; and
    (b) front and rear thrust bearings disposed proximate the front and rear needle bearings.

3. The tool of claim 1 wherein the workpiece holding collet assembly comprises:
    (a) a collet housing member attached to the circular flange of the axial feed housing;
    (b) a collet member having a central opening of adjustable size;
    (c) means for clamping the collet member onto the collet housing member; and
    (d) means for adjusting the size of the adjustable opening.

4. The tool of claim 1 and further including:
    (a) a drive motor having a drive shaft coupled to the second end of the shaft member; and
    (b) a base for supporting the drive motor.

5. The tool of claim 1 and further including:
    (a) a base plate;
    (b) a pedestal projecting upward from a major surface of the base plate;
    (c) a mounting ring affixed to the pedestal; and
    (d) a clamping ring for securing the mounting ring to the drive motor.

6. A method for squaring an end of a tubular workpiece comprising the steps of:
    (a) providing a tool as defined by claim 4;
    (b) clamping a workpiece in the workpiece holding collet assembly;
    (c) energizing the drive motor to spin the shaft member and tool bit; and
    (d) rotating the feed ring about the axial feed housing to axially displace the workpiece carried by the workpiece holding collet against the spinning tool bit.

* * * * *